US010261780B2

(12) United States Patent
de Kruijf et al.

(10) Patent No.: US 10,261,780 B2
(45) Date of Patent: Apr. 16, 2019

(54) TRANSPARENT UPGRADE OF A SYSTEM SERVICE OR APPLICATION

(71) Applicant: Google Inc., Mountain View, CA (US)

(72) Inventors: Marc de Kruijf, Madison, WI (US); Christopher Alfeld, Madison, WI (US); William Evans, Madison, WI (US); Michael Marty, Madison, WI (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 15/583,849

(22) Filed: May 1, 2017

(65) Prior Publication Data

US 2018/0314515 A1 Nov. 1, 2018

(51) Int. Cl.
*G06F 8/656* (2018.01)
*H04L 29/08* (2006.01)

(52) U.S. Cl.
CPC .............. *G06F 8/656* (2018.02); *H04L 67/34* (2013.01)

(58) Field of Classification Search
CPC .................................. G06F 8/67; G06F 8/656
USPC .......................................................... 717/170
See application file for complete search history.

(56) References Cited

U.S. PATENT DOCUMENTS 6,360,363 B1 * 3/2002 Moser .................... G06F 8/656 717/170
7,000,229 B2 * 2/2006 Gere .................. G06F 11/1433 707/999.2
7,155,462 B1 12/2006 Singh et al.
7,307,986 B2 * 12/2007 Henderson ............ H04L 49/254 370/366
7,555,751 B1 * 6/2009 Abbavaram ............ G06F 8/656 717/168
8,713,556 B2 * 4/2014 Bozak ....................... G06F 8/65 717/170
9,438,494 B2 * 9/2016 Samuell .............. H04L 43/0811
(Continued)

OTHER PUBLICATIONS

Hayden, et al., "Kitsune: Efficient, General-purpose Dynamic Software Updating for C," ACM T Progr Lang Sys Oct. 19-26, 2012, vol. V, No. N, Article A, Tucson, Arizona, USA, 16 pages.
(Continued)

*Primary Examiner* — Lewis A Bullock, Jr.
*Assistant Examiner* — Theodore E Hebert
(74) *Attorney, Agent, or Firm* — McDermott Will & Emery LLP

(57) ABSTRACT

Systems and methods for updating an application without a restart are provided. A processor can start a second application instance while a first application instance is still executing. The first application instance can transfer a first set of state information to the second application instance. The second application instance can declare its readiness for activation in response to completion of the transfer. The first application instance can deactivate in response to the declaration. Deactivation includes transferring a second set of state information from the first application instance to the second application instance and releasing single-access resources. The second application instance can activate. Activation includes receiving the second set of state information, and accessing the single-access resources. The second application instance can declare that activation is complete in response to completion of the activation. The first application instance can terminate in response to the declaration.

26 Claims, 5 Drawing Sheets

100

Server 110
Processor 130
Application A 132
Master 136
Application B 134
Memory 140
Memory A 142
Memory B 144
Network Interface 150
Switch 120
Network 105

(56) References Cited

U.S. PATENT DOCUMENTS

2006/0075076 A1 4/2006 Sinha
2009/0217244 A1* 8/2009 Bozak ........................ G06F 8/65 717/124
2010/0235825 A1* 9/2010 Azulay ..................... G06F 8/65 717/172
2014/0059534 A1* 2/2014 Daum ....................... G06F 8/65 717/172
2014/0229928 A1* 8/2014 Edstrom ................. G06F 8/656 717/171
2014/0280486 A1* 9/2014 Seay ....................... H04L 67/10 709/203
2014/0289720 A1* 9/2014 Fries ......................... G06F 8/68 717/170
2016/0092202 A1 3/2016 Filali-Adib et al.
2016/0092203 A1* 3/2016 Filali-Adib ............... G06F 8/67 717/171
2016/0306649 A1 10/2016 Gunti et al.
2016/0371130 A1* 12/2016 Mullins ................... G06F 9/485
2017/0090897 A1* 3/2017 Veereshwara ............. G06F 8/65
2017/0094034 A1 3/2017 Banerjee et al.

OTHER PUBLICATIONS

Hayden, et al., "State Transfer for Clear and Efficient Runtime Updates," Data Engineering Workshops (ICDEW), Apr. 11-16, 2011, IEEE 27th International Conference, 6 pages.

Pina, "Atomic Dynamic Software Upgrades Using Software Transactional Memories," MSc Thesis, Nov. 2009, Technical University of Lisbon, 5 pages.

Swift, et al., "Live Update for Device Drivers," ICDEW'11 Proceedings of the 2011 IEEE 27th International Conference on Data Engineering Workshops, Apr. 11-16, 2011, IEEE Computer Society, WA, USA, 11 pages.

International Search Report and Written Opinion dated Jun. 12, 2018 in International (PCT) Application No. PCT/US2018/021542.

Extended European Search Report dated Sep. 13, 2018 in European Patent Application No. 18167229.6 (8 pages).

Combined Search and Examination Report, dated Sep. 28, 2018, for United Kingdom Patent Application No. GB1804245.7 (6 pages).

* cited by examiner

TRANSPARENT UPGRADE OF A SYSTEM SERVICE OR APPLICATION

BACKGROUND

In long-running systems, it is often necessary to upgrade a service or application to incorporate bug fixes, new features, and/or performance enhancements. Traditionally, upgrades involve stopping the service, making the change, and restarting the service as three distinct steps. Because this process takes the service offline or a period of time, the upgrade is not transparent and can disrupt the user.

SUMMARY

At least one aspect is directed to a system for updating an application without a restart. The system includes a processor and a memory having instructions stored thereon. The instructions cause the processor to execute a first application instance. The instructions cause the processor to start a second application instance while the first application instance is still executing. The second application instance includes an updated version of the first application instance. The instructions cause the processor to transfer a first set of state information from the first application instance to the second application instance. The instructions cause the processor to declare, by the second application instance in response to completion of the transfer of the first set of state information, readiness for activation. The instructions cause the processor to deactivate the first application instance. Deactivation includes transferring a second set of state information from the first application instance to the second application instance. Deactivation includes releasing, by the first application instance, single-access resources. The instructions cause the processor to activate the second application instance. Activation includes receiving the second set of state information, and accessing the single-access resources. The instructions cause the processor to declare, by the second application instance in response to completion of the activation of the second application instance, that activation is complete. The instructions cause the processor to terminate the first application instance.

In some implementations, the instructions can cause the processor to execute a master application to coordinate operations between the first application instance and the second application instance. The master application can initiate the start of the second application instance, receive the declaration of readiness for activation from the second application instance, instruct the first application instance to deactivate subject to receiving the declaration of readiness, receive a notification from the first application instance that deactivation is complete, instruct the second application instance to activate subject to receiving the notification, and terminate the first application instance. In some implementations, the master application can coordinate operations between a third application instance and a fourth application instance including an update of the third application instance, wherein the third application instance and the fourth application instance perform a different service from the first application instance and the second application instance.

In some implementations, the first application instance can periodically check a pre-determined address or socket for the presence of the second application instance.

In some implementations, the first set of state information can include at least one of: a list of connected clients, locations of shared memory spaces, file descriptors, and access to kernel resources.

In some implementations, the first set of state information can be written into an intermediate format that can be interpreted by both the first application instance and the second application instance.

In some implementations, at least a subset of the first set of state information can be associated with specific clients, and the subset can be transferred via serialization into an intermediate format that differs from a form used to serve the specific clients.

In some implementations, the second set of state information can include at least one of: TCP congestion window size, sequence identifiers of any packets in transit, and sequence identifiers of any packets received but not yet acknowledged.

In some implementations, the instructions can cause the processor to: maintain a blackout period between commencing deactivation of the first application instance and completing activation of the second application instance, during which neither the first application instance nor the second application instance will respond to any user input.

At least one aspect is directed to a method of updating an application without a restart. The method includes executing, by a processor, a first application instance. The method includes starting, by the processor, a second application instance while the first application instance is still executing. The second application instance includes an updated version of the first application instance. The method includes transferring, by the processor, a first set of state information from the first application instance to the second application instance. The method includes declaring, by the second application instance in response to completion of the transfer of the first set of state information, readiness for activation. The method includes deactivating, by the processor, the first application instance. Deactivation includes transferring a second set of state information from the first application instance to the second application instance. Deactivation includes releasing, by the first application instance, single-access resources. The method includes activating, by the processor, the second application instance. Activation includes receiving the second set of state information, and accessing the single-access resources. The method includes declaring, by the second application instance in response to completion of the activation of the second application instance, that activation is complete. The method includes terminating, by the processor, the first application instance.

In some implementations, the method can include executing, by the processor, a master application to coordinate operations between the first application instance and the second application instance. The master application can initiate the start of the second application instance, receive the declaration of readiness for activation from the second application instance, instruct the first application instance to deactivate subject to receiving the declaration of readiness, receive a notification from the first application instance that deactivation is complete, instruct the second application instance to activate subject to receiving the notification, and terminate the first application instance. In some implementations, the master application can coordinate operations between a third application instance and a fourth application instance including an update of the third application instance, wherein the third application instance and the fourth application instance perform a different service from the first application instance and the second application instance.

In some implementations, the method can include periodically checking, by the first application instance, a predetermined address or socket for the presence of the second application instance.

In some implementations, the first set of state information can include at least one of: a list of connected clients, locations of shared memory spaces, file descriptors, and access to kernel resources.

In some implementations, the first set of state information can be written into an intermediate format that can be interpreted by both the first application instance and the second application instance.

In some implementations, at least a subset of the first set of state information can be associated with specific clients, and the subset can be transferred via serialization into an intermediate format that differs from a form used to serve the specific clients.

In some implementations, the second set of state information can include at least one of: TCP congestion window size, sequence identifiers of any packets in transit, and sequence identifiers of any packets received but not yet acknowledged.

In some implementations, the method can include maintaining, by the processor, a blackout period between commencing deactivation of the first application instance and completing activation of the second application instance, during which neither the first application instance nor the second application instance will respond to any user input.

At least one aspect is directed to a system for updating an application without a restart. The system includes a processing means and a memory means having instructions stored thereon. The instructions cause the processing means to execute a first application instance. The instructions cause the processing means to start a second application instance while the first application instance is still executing. The second application instance includes an updated version of the first application instance. The instructions cause the processing means to transfer a first set of state information from the first application instance to the second application instance. The instructions cause the processing means to declare, by the second application instance in response to completion of the transfer of the first set of state information, readiness for activation. The instructions cause the processing means to deactivate the first application instance. Deactivation includes transferring a second set of state information from the first application instance to the second application instance. Deactivation includes releasing, by the first application instance, single-access resources. The instructions cause the processing means to activate the second application instance. Activation includes receiving the second set of state information, and accessing the single-access resources. The instructions cause the processing means to declare, by the second application instance in response to completion of the activation of the second application instance, that activation is complete. The instructions cause the processing means to terminate the first application instance.

These and other aspects and implementations are discussed in detail below. The foregoing information and the following detailed description include illustrative examples of various aspects and implementations, and provide an overview or framework for understanding the nature and character of the claimed aspects and implementations. The drawings provide illustration and a further understanding of the various aspects and implementations, and are incorporated in and constitute a part of this specification.

BRIEF DESCRIPTION OF THE DRAWINGS

The accompanying drawings are not intended to be drawn to scale. Like reference numbers and designations in the various drawings indicate like elements. For purposes of clarity, not every component may be labeled in every drawing. In the drawings.

DETAILED DESCRIPTION

Figure 1:
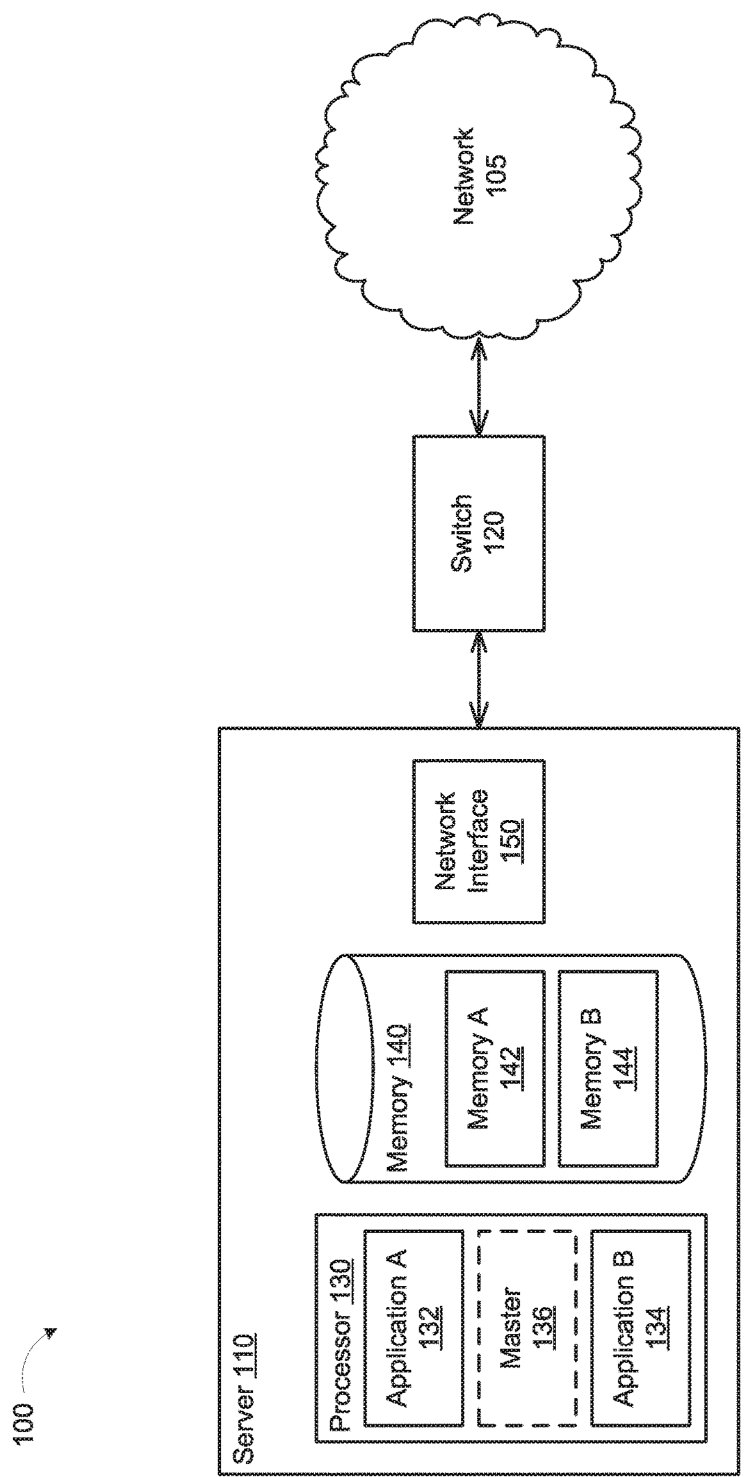
FIG. 1 is a block diagram of a system for updating an application without a restart, according to an illustrative implementation.

This disclosure relates generally to a system and method that facilitates upgrade of a server application without the need for a restart of the application or server. The upgrade can therefore be transparent or nearly transparent to server clients.

Long-running system services and applications need occasional or periodic bug fixes, patches, updates, or upgrades (generically referred to as "updates"). Traditionally, the application is stopped, updated, and restarted in three distinct sequential steps. Because service is halted for some period of time, however, the update is not transparent and is disruptive to the user.

The systems and methods proposed involve starting a new version of the application while the old version of the application is still running. The new version can include any application updates. The new version can undertake any initialization that it can perform while the old version is still running. This can include requesting and/or receiving any programming from external sources, receiving a transfer of state information from the old version of the application, and/or any other initialization that can be performed without conflicting with the old version. When the new version is ready for activation, it can declare its readiness. The old version can deactivate. Deactivation can include the minimal set of work required to shut down or transfer resources such that the new version can activate without any resource conflicts. When deactivation of the old version is complete, the new version can activate. In some implementations, activation can be a mirror image of the deactivation. When the new version completes activation, the old version can lazily terminate; that is, termination, which can involve a number of non-trivial operations, can be performed at times and in a manner that does not interfere with other server operations.

In some implementations, the server can execute an additional "master" application that can coordinate or execute the application update. The master can, for example and without limitation, initiate the new version, receive the ready-for-activation message from the new version, notify the old version to deactivate, receive a message that the old version is deactivated, notify the new version to activate, and terminate the old version. Although the master is not necessary, it can provide several benefits. The master can be a relatively simple application, and can therefore be very stable. The master can provide a single point of reference for the state of a transfer. For example, the master can have complete information regarding the state of the update in the event of a failure. The master can perform various kinds of health checking and invariant checking to make sure that the upgrade happens successfully and in a timely fashion. If any step of the update fails, the master can fall back to a rollback or escalation procedure independent of whatever failed state the application is in. In some implementations, the master can assist with updating multiple different applications, and provide a single point of reference for all updates.

In some implementations, the state transfer can involve writing some or all of the state into an intermediate format that can be interpreted by both the old version and the new version. The intermediate format can allow the state's binary representation to vary between the old and the new version or upgrade purposes. A subset of the state can include state associated with specific users or clients. In some implementations, this user state can be transferred via serialization into an intermediate format having a binary representation that differs from the one used to serve users.

In some implementations, state transfer can occur in multiple stages. This can reduce the duration of time during which application availability may be limited. A first stage of state transfer can occur during the initialization phase of the new application. The first stage can include transfer of background state information, such as a list of connected clients and locations of memory spaces shared between the applications and clients. The background state information can also include file descriptors and access to kernel resources. Beginning with the start of the first stage of state transfer, the application may cease allowing more invasive changes in state, such as allowing new clients to connect to the server or accepting new memory registrations; however, the application may continue serving existing clients, including allowing the existing clients to open new traffic flows. This temporary reduction in functionality may not be unreasonably disruptive because these types of changes tend to be infrequent.

A second stage of state transfer can occur during deactivation of the old version of the application. This will include state information needed for transparent service to clients; for example, TCP state information such as the TCP congestion window size, what packets are in flight, and sequence identifiers of any packets in transit or received by not yet acknowledged. About the time of the second stage of state transfer, the old version can transfer to the new version resources that the two cannot share; for example, sockets and ports that both versions of the application cannot access at the same time. During this period of resource handover and state transfer, the application may have a blackout period during which it may not respond to incoming packets, and not transmit packets of its own. Therefore, it would be beneficial to keep this period as short as possible. Splitting the state transfer operations into two or more stages can help keep the second stage of state transfer shorter in duration. In some implementations, the blackout period can be kept below 100 ms.

FIG. 1 is a block diagram of a system 100 for updating an application without a restart, according to an illustrative implementation. The system 100 includes a server 110, a switch 120, and a network 105. The server 110 includes a processor 130, a memory 140, and a network interface 150.

The server 110 is a computer program or device that provides services to client devices. The services can include processing or sharing of data for the clients. The server 110 can provide the services of one or more of an application server, database server, file server, mail server, Domain Name System (DNS) server, game server, or the like. For example, the server 110 may execute a message passing application, network driver applications, and applications for transport layer support or network layer support. Other applications can include always-on virtual reality or augmented reality system, mobile applications, or remote productivity applications such as hosted virtual machines. In some implementations, the server 110 can connect to a network, such as the network 105, via one or more switches, such as the switch 120. The switch 120 can be a network switch or system of network switches including one or more of a router, modem, edge switch, top-of-rack switch, or the like. In some implementations, the server 110 can connect to the network 105 directly via wireless, wired, or optical connection. For example, the server 110 can connect to the network via a cellular LTE tower, a mobile access point, or a satellite. The network 105 can represent a secure, local-area network (LAN) such as a data center network, or an unsecure, wide-area network (WAN) such as the Internet.

The server 110 includes a processor 130, a memory 140, and a network interface 150. The processor 130 can be a microprocessor or a system of multiple microprocessors. The one or more microprocessors can include single or multicore architecture. The processor 130 can include a customized or programmable integrated circuit (IC) such as an application-specific integrated circuit (ASIC) or a field-programmable gate array (FPGA). The processor 130 can execute a kernel, an operating system, and one or more applications or services. The applications include software programs executed by the server 110 for direct or indirect use by clients. The kernel and operating system, in contrast, manage the server 110 hardware and software resources, and provide services to the applications.

The memory 140 can include one or a combination of solid state, magnetic, or optical data storage devices. The memory 140 can include random access memory and direct-access data storage, and be of any volatile or non-volatile type. The memory 140 can include data and/or programming code. The programming code can include the operating system and any applications or software services executed by the server 110. The memory 140 can store both the programming code of the applications executing on the processor 130, and data used or produced by the applications.

From time to time, it may be desirable to upgrade an application to fix a bug, install a patch or update, or upgrade to a new version (operations generically referred to herein as "updates"). Traditionally this has required stopping the application, updating the application, and restarting the application in three distinct steps. Before stopping the application, the server 130 can store a checkpoint that can be loaded into the updated application after the restart to allow the updated application to continue services that the application performed prior to the update. However, despite having the ability to pick up where it left off, the application is still offline and unresponsive to clients for a period of time. In some cases it may be possible to use redundant hardware, and migrate clients to a secondary machine to allow the primary machine to update the application without disrupting service to the clients. This adds cost to the system, both in the additional infrastructure required, and the complexity of migrating applications states between machines. It would therefore be beneficial to be able to update the application on the machine without restarting.

To update an application with minimal disruption to client use, the server 110 can execute two application instances on the processor 130. That is, the processor 130 can contemporaneously execute both an Application A 132 and an Application B 134. The processor 130 can execute Application A 132 in service of one or more clients. If an update to the application is desired, the processor 130 can start a second instance of the application as Application B 134. Application A 132 and Application B 134 include programming for a protocol to handle mutual discovery and state transfer. The protocol can define how the application instances discover each other and exchange state information, including an intermediate format for state data where needed. Once both application instances are executing, one can locate the other via a periodic check or poll of a well-known address such as a Unix domain socket. Once Application A 132 and Application B 134 establish a communication link, they can begin transferring state information stored in the memory 140. The state information includes information about the status of the application instance and information about its service of clients. The state information can include background state information and foreground state information. Background state information and foreground state information are arbitrary terms used in this disclosure to differentiate various aspects of state information based on the relative weight or invasiveness of changes to that state information. For example and without limitation, background state information may include information such as a list of connected clients, locations of memory spaces shared between an application instance and a client, file descriptors, and access to kernel resources. Foreground state information may include, for example and without limitation, transmission control protocol (TCP) congestion window size, sequence identifiers of any packets in transit, and sequence identifiers of packets received but not yet acknowledged. In general, changes to foreground state information tend to be routine and frequent, with changes occurring with each transmitted or received request, response, or even packet. In contrast, changes to background state information tend to represent configuration changes with broader effect, such as adding or dropping a client, and accessing or releasing a system resource.

The application instances can store their state information in the memory 140. Application A 132 may store its state information in Memory A 142 of the memory 140, and Application B 134 may store its state information in Memory B 144. Memory A 142 and Memory B 144 may represent different spaces or registers within a contiguous piece of memory hardware, or may represent distinct pieces of memory hardware such as separate memory ICs. In some implementations, Memory A 142 and Memory B 144 may overlap partially or wholly in a shared memory region. In implementations employing shared memory spaces, a subset of the state information may not need to be transferred at all. During a state transfer, the application instances may coordinate with each other to copy the state information from Memory A 142 to Memory B 144.

Although both application instances can remain online at the same time, there may be periods of time during state information transfer where the neither application instance is able to update some state information. During those periods, it may not be possible to make configuration changes or respond to incoming requests. To minimize the impact of periods of reduced functionality on client service, the state information can be transferred from Application A 132 to Application B 134 in two or more stages. For example, Application A 132 can transfer background state information to Application B 134 first. During the transfer of background state information, Application A 132 can rebuff attempts to change the background state in order to prevent the background state information from becoming obsolete during the application update. Because changes to the background state are relatively infrequent, however, there is a low likelihood that clients will experience a disruption of most services during this period. Once Application A 132 has transferred the background state information to Application B 134, Application B 134 can declare its readiness to activate to Application A 134. Application A 132 can transfer its foreground state to Application B 134. During the transfer of foreground state information, the applications instances may not be able to maintain stateful communications. Clients may experience a blackout during this period as Application A 132 ignores any received packets. But because the foreground state information represents a relatively small amount of data, transfer of the foreground state information can occur relatively quickly. The blackout period can thus be kept brief. In some implementations, the blackout period can be kept to less than 10 ms. In some implementations, the blackout period can be kept to less than 20 ms, 50 ms, or 100 ms. The operations of an application update are described in further below with respect to FIG. 2.

In some implementations, the server 110 can additionally execute a master application 136 on the processor 130. The master 136 can coordinate operations between Application A 132 And Application B 134. For example and without limitation, the master 136 can initiate Application B 134, receive a ready-for-activation message from Application B 134, notify Application A 132 to deactivate, receive a message that Application A 132 is deactivated, notify Application B 134 to activate, and terminate Application A 132. Although the master 136 is not necessary for all implementations, it can provide several benefits. The master 136 can be a relatively simple stateless application, and can therefore be very stable. The master 136 can provide a single point of reference for the state of a transfer. For example, the master 136 can have complete information regarding the state of the update in the event of a failure. The master 136 can perform various kinds of health checking and invariant checking to make sure that the upgrade happens successfully and in a timely fashion. If any step of the update fails, the master 136 can fall back to a rollback or escalation procedure independent of whatever failed state the application is in. In some implementations, the master 136 can assist with updating multiple different applications or application types, and provide a single point of reference for all updates. For example, the master 136 can coordinate operations between a third application instance and a fourth application instance that includes an update of the third application instance. The third application instance and the fourth application instance can perform a different service from the first application instance and the second application instance. The operations of an application update with assistance from the master 136 are described in further below with respect to FIG. 3.

Figure 2:
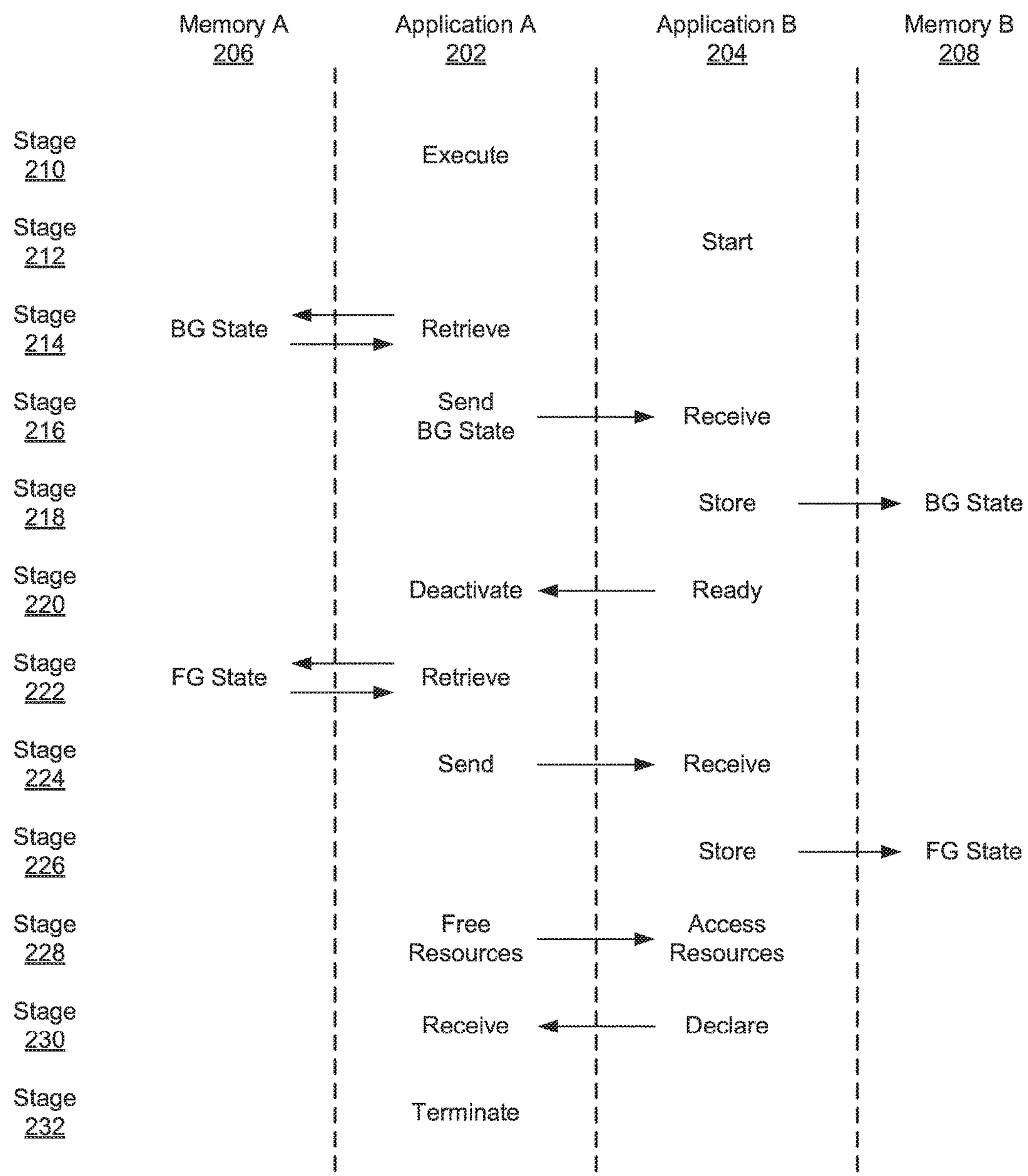
FIG. 2 shows a sequence of events for updating an application without a restart, according to an illustrative implementation.

FIG. 2 shows a sequence of events 200 for updating an application without a restart, according to an illustrative implementation. The sequence 200 describes operations of, and communications between, an Application A 202, an Application B 204, a Memory A 206, and a Memory B 208. Application A 202 and Application B 204 can be similar to Application A 132 and Application B 134, respectively, as described above with respect to FIG. 1. Similarly, Memory A 206 and Memory B 208 can be similar to Memory A 142 and Memory B 144, respectively, as described above with respect to FIG. 1.

At stage 210, Application A 202 is executing, having been launched previously, and presumably servicing clients for some period of time.

At stage 212, Application B 204 is started. Application A 202 and Application B 204 are now executing concurrently, although Application B 204 is not currently servicing clients. During stage 212, Application B 204 will locate Application A 202 (or vice-versa). The application instances can discover and connect to each other via a well-known port such as a Unix domain socket. When the application instances make contact, they can initiate the state transfer.

At stage 214, Application A 202 retrieves its background state information from Memory A 206. This can include retrieving a list of connected clients, the locations of shared memory spaces, file descriptors, and releasing kernel resources. After stage 214, neither Application A 202 nor Application B 204 can make changes to the background state information until Application B 204 activates at stage 230. During this period of reduced functionality, Application A 202 may not be able to open new connections, or access certain system resources being transferred from Application A 202 to Application B 204.

At stage 216, Application A 202 sends the background state information to Application B 204. In some implementations, Application A 202 can convert the background state information into an intermediate format such that it can be interpreted by both Application A 202 and Application B 204. In some implementations, at least a subset of the background state information is associated with specific client devices. Application A 202 can transfer the background state information associated with specific client devices to Application B 204 via serialization into an intermediate format that differs from a form used to serve the client devices.

At stage 218, Application B 202 stores the received background state information to Memory B 208.

At stage 220, Application B 204 declares its readiness for activation.

At stage 222, in response to receiving the declaration from Application B 204, Application A 202 retrieves its foreground state information from Memory A 206. After stage 222, neither Application A 202 nor Application B 204 can make changes to the foreground state information until Application B 204 activates at state 230. During this period, Application A 202 will ignore any incoming packets, creating a blackout period.

At stage 224, Application A 202 sends the foreground state information to Application B 204. In some implementations, Application A 202 can convert the foreground state information into an intermediate format such that it can be interpreted by both Application A 202 and Application B 204. In some implementations, at least a subset of the foreground state information is associated with specific client devices. Application A 202 can transfer the foreground state information associated with specific client devices to Application B 204 via serialization into an intermediate format that differs from a form used to serve the client devices.

At stage 226, Application B 204 stores the received foreground state information in Memory B 208.

At stage 228, Application A 202 frees system resources. These can include single-user system resources that cannot be accessed by more than one application or application instance at a time, such a certain ports, peripherals, or memory locations. Application B 204 can access these resources as they are freed by Application A 202. Once Application B 204 has accessed all of the freed resources, it becomes the active application instance.

At state 230, Application B 204 declares to Application A 202 that activation is complete. Application B 204 can begin handling traffic to and from clients, thus ending the blackout period.

At stage 232, Application A 202 can terminate. Termination may involve non-trivial operations that require significant system resources. To avoid interfering with execution of other applications, the server 110 can terminate Application A 202 lazily; that is, with low priority during periods of idleness.

The various stages of the sequence 200 may occur in different orders and may have multiple stages occurring concurrently, and can include more or fewer stages than those described above without departing from the scope of this disclosure.

Figure 3:
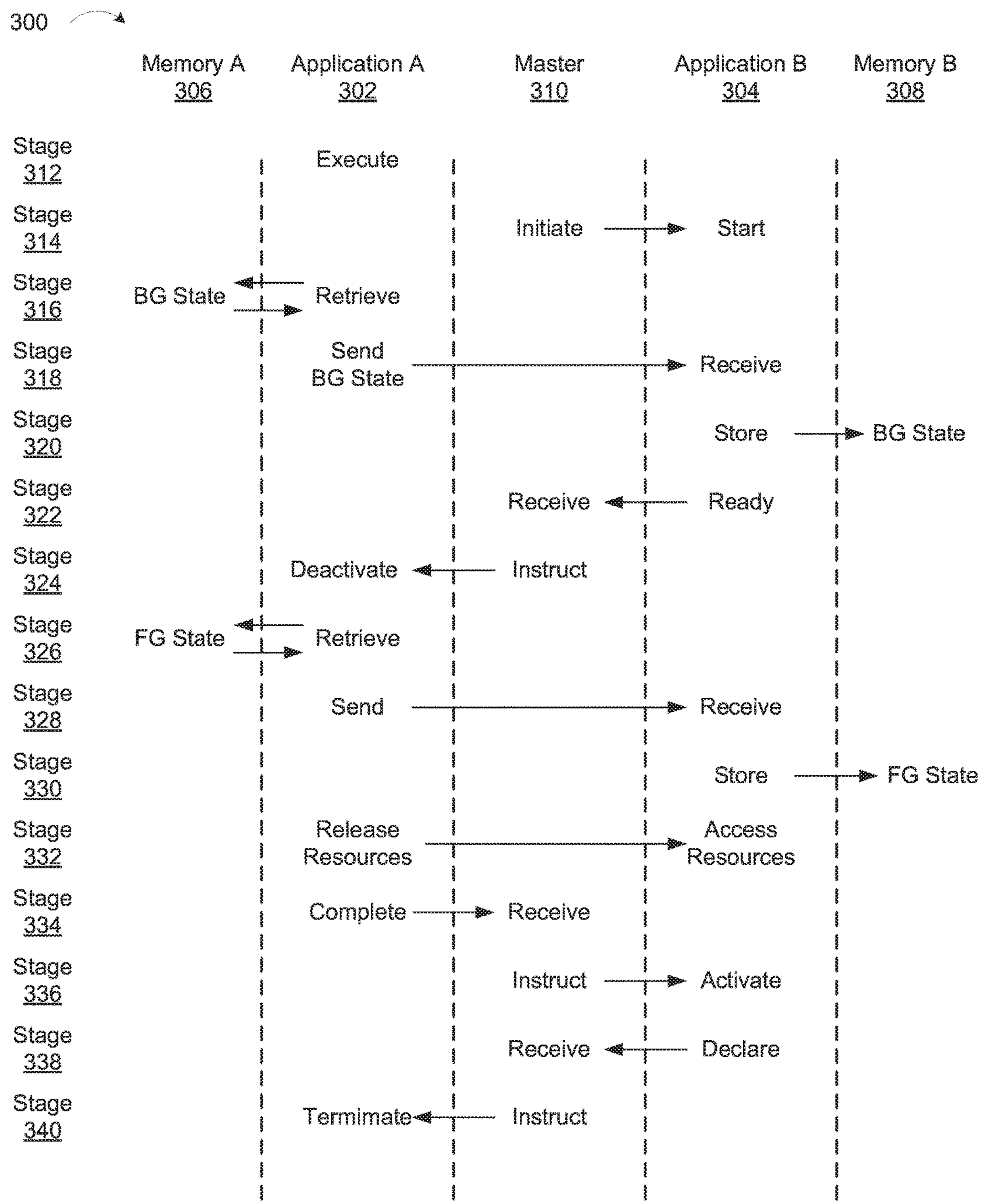
FIG. 3 shows a sequence of events for using a master application for updating an application without a restart, according to an illustrative implementation.

FIG. 3 shows a sequence of events 300 for using a master application 310 for updating an application without a restart, according to an illustrative implementation. The sequence 300 describes operations of, and communications between, an Application A 302, an Application B 304, a Memory A 306, a Memory B 308, and a master 310. Application A 302 and Application B 304 can be similar to Application A 132 and Application B 134, respectively, as described above with respect to FIG. 1. Similarly, Memory A 306 and Memory B 308 can be similar to Memory A 142 and Memory B 144, respectively, as described above with respect to FIG. 1. The master 310 can be similar to the master 136 described above with respect to FIG. 1.

At stage 312, Application A 302 is executing, having been launched previously, and presumably servicing clients for some period of time.

At stage 314, the master 310 initiates Application B 304. Application A 302 and Application B 304 are now executing concurrently, although Application B 304 is not currently servicing clients. In some implementations, Application B 304 can discover Application A 302 (or vice-versa) via a well-known port such as a Unix domain socket. When the application instances make contact, they can initiate the state transfer. In some implementations, the master 310 will locate each application instance and mediate communication between them. At an appropriate time, the master 310 can initiate the state transfer by instructing Application A 302 to retrieve its background state from Memory A 306.

At stage 316, Application A 302 retrieves its background state information from Memory A 306. This can include retrieving a list of connected clients, the locations of shared memory spaces, file descriptors, and releasing kernel resources. After stage 316, neither Application A 302 nor Application B 304 can make changes to the background state information until Application B 304 activates at stage 336. During this period of reduced functionality, Application A 302 may not be able to open new connections, or access certain system resources being transferred from Application A 302 to Application B 304.

At stage 318, Application A 302 sends the background state information to Application B 304. In some implementations, Application A 302 can send the background state information to Application B 304. In some implementations, Application A 302 can send the background state information to Application B 304 via the master 310. In some implementations, Application A 302 can convert the background state information into an intermediate format such that it can be interpreted by both Application A 302 and Application B 304. In some implementations, at least a subset of the background state information is associated with specific client devices. Application A 302 can transfer the background state information associated with specific client devices to Application B 304 via serialization into an intermediate format that differs from a form used to serve the client devices.

At stage 320, Application B 302 stores the received background state information to Memory B 308.

At stage 322, Application B 304 declares its readiness for activation by sending a declaration to the master 310. In some implementations, the master 310 can obtain the readiness status of Application B 304 by periodically polling the file system for a signal or flag left by Application B 304.

At stage 324, the master 310 sends an instruction to Application A 302 to commence deactivation. In some implementations, Application A 302 can obtain the instruction to deactivate by periodically polling the file system for a signal or flag left by the master 310.

At stage 326, in response to receiving the deactivation instruction from the master 310, Application A 302 retrieves its foreground state information from Memory A 306. After stage 326, neither Application A 302 nor Application B 304 can make changes to the foreground state information until Application B 304 activates at state 336. During this period, Application A 302 will ignore any incoming packets, creating a blackout period.

At stage 328, Application A 302 sends the foreground state information to Application B 304. In some implementations, Application A 302 can send the foreground state information to Application B 304. In some implementations, Application A 302 can send the foreground state information to Application B 304 via the master 310. In some implementations, Application A 302 can convert the foreground state information into an intermediate format such that it can be interpreted by both Application A 302 and Application B 304. In some implementations, at least a subset of the foreground state information is associated with specific client devices. Application A 302 can transfer the foreground state information associated with specific client devices to Application B 304 via serialization into an intermediate format that differs from a form used to serve the client devices.

At stage 330, Application B 304 stores the foreground state information in Memory B 308.

At stage 332, Application A 302 releases system resources. These can include single-user system resources that cannot be accessed by more than one application or application instance at a time, such a certain ports, peripherals, or memory locations. In some implementations, the master 310 can receive notification from Application A 302 that Application B 304 can access these resources as they are freed by Application A 302. Once Application B 304 has accessed all of the released resources, it can become the active application instance.

At stage 334, Application A 302 can notify the master 310 that the transfer of foreground state information and the release of resources is complete.

At stage 336, upon receiving the notification from Application A 302 that the transfer of foreground state information and the release of resources is complete, the master 310 can instruct Application B to activate.

At state 338, Application B 304 declares to the master 310 that activation is complete. Application B 304 can begin handling traffic to and from clients, thus ending the blackout period.

At stage 340, the master 310 instructs Application A 302 to terminate. Termination may involve non-trivial operations that require significant system resources. To avoid interfering with execution of other applications, the server 110 can terminate Application A 302 lazily; that is, with low priority during periods of idleness.

During the application update, the master 310 can maintain status information regarding the state of the application update. If at any point the update fails, the master 310 can either recommence the update from the beginning, or from any appropriate intermediate stage. The master 310 can also provide state information regarding the state of the application update to other application executing on the server 110. In some implementations, the master 310 can manage updates to multiple applications either serially or concurrently.

The various stages of the sequence 300 may occur in different orders and may have multiple stages occurring concurrently, and can include more or fewer stages than those described above without departing from the scope of this disclosure.

Figure 4:
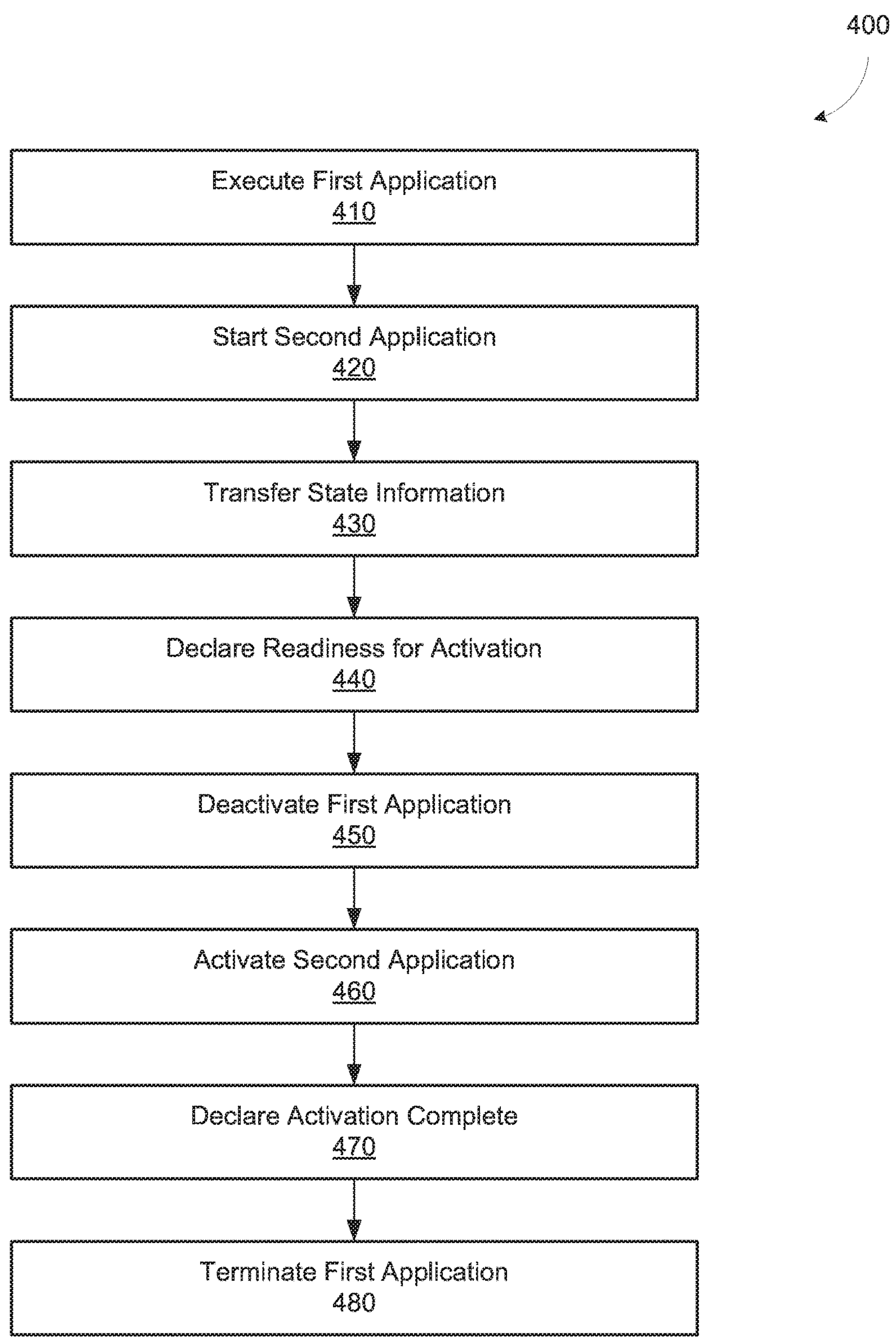
FIG. 4 is flowchart of an example method of updating an application without a restart, according to an illustrative implementation.

FIG. 4 is flowchart of an example method 400 of updating an application without a restart, according to an illustrative implementation. The method 400 includes executing a first application instance (stage 410). The method 400 includes starting a second application instance while the first application instance is still executing (stage 420). The method 400 includes transferring background state information from the first application instance to the second application instance (stage 430). The method 400 includes declaring, by the second application instance in response to completion of the transfer of the background state information, readiness for activation (stage 440). The method 400 includes deactivating the first application instance (stage 450). The method 400 includes activating the second application instance (stage 460). The method 400 includes declaring, by the second application instance in response to completion of the activation of the second application instance, that activation is complete (stage 470). The method 400 includes terminating the first application instance (stage 480).

The method 400 includes executing a first application instance (stage 410). At the start of the method 400, the server 110 will be executing the first application instance on the processor 130. In some implementations, the first application instance can periodically seek to discover a second application instance. The first application instance can seek to discover the second application instance by monitoring a well-known address. The first application instance can poll the well-known address periodically, such as every second, every few seconds, or at some other appropriate interval.

The method 400 includes starting a second application instance while the first application instance is still executing (stage 420). The server 110 can start execution of the second application instance on the processor 130 while the first application instance is still executing. The second application instance includes an updated version of the first application instance. That is, the second application instance can represent a new version of the first application instance including bug fixes, patches, or software upgrades. The first application instance and the second application instance can discover each other over a well-known address such as a Unix domain socket and agree to initiate a transfer of state.

In some implementations, the second application instance can seek to discover the first application instance by polling a well-known address.

The method 400 includes transferring background state information from the first application instance to the second application instance (stage 430). In some implementations, the first application instance can retrieve its background state information from the memory 140 and send it to the second application instance, which can in turn store it in a different portion of the memory 140. In some implementations, the first application instance can turn over control of the memory area containing the background state information to the second application instance. In some implementations, a combination of data transmission and memory sharing can be used to share the background state information. In some implementations, the background state information can include one or more of: a list of connected client devices, locations of memory spaces shared with connected clients, file descriptors, and access to kernel resources. In some implementations, the first application instance can convert the background state information into an intermediate format. The intermediate format such that it can be interpreted by both the first application instance and the second application instance. In some implementations, at least a subset of the background state information is associated with specific client devices. The first application instance can transfer the background state information associated with specific client devices to the second application instance via serialization into an intermediate format that differs from a form used to serve the client devices.

The method 400 includes declaring, by the second application instance in response to completion of the transfer of the background state information, readiness for activation (stage 440). In some implementations, the second application instance can send the notification to the first application instance.

The method 400 includes deactivating the first application instance (stage 450). The first application instance, upon receiving the declaration of readiness from the second application instance, can commence deactivation. Deactivation can include transferring foreground state information from the first application instance to the second application instance. In some implementations, the foreground state information can include, for each of one or more client devices, one or more of: a TCP congestion window size, sequence identifiers of any packets in transit, and sequence identifiers of any packets received but not yet acknowledged. Deactivation can further include releasing, by the first application instance, single-access resources; that is, system resources that can only be accessed by one application instance at a time. Once the first application instance commences deactivation, the application instances can enter a blackout period during which the first application instance and the second application instance will ignore any received packets. The blackout period can continue until the second application commences activation.

The method 400 includes activating the second application instance (stage 460). Activation can include receiving, by the second application instance, the foreground state information from the first application instance. Activation can further include accessing, by the second application instance, the single-access resources previously freed by the first application instance.

The method 400 includes declaring, by the second application instance in response to completion of the activation of the second application instance, that activation is complete (stage 470). Once the second application instance has received the foreground state information and accessed the single-access resources, the second application instance can declare that activation is complete. Once activation is complete, the second application instance can take over any client services being handled by the first application instance prior to the update, as well as begin accepting new client connections.

The method 400 includes terminating the first application instance (stage 480). The first application instance, upon receiving a notification from the second application or an instruction from the master application, can terminate in a manner that doesn't disrupt operation of other applications executing on the processor 130.

In some implementations, a master application can help coordinate operations between the first application instance and the second application instance. For example, and without limitation, the master application can initiate the start of the second application instance in stage 420. The master application can receive the declaration of readiness for activation from the second application instance in stage 440, and instruct the first application instance to deactivate in stage 450. The master can receive a notification from the first application instance that deactivation is complete in stage 450, and instruct the second application instance to activate in stage 460. The master application can instruct the first application instance to terminate in stage 480 following a notification from the second application instance that activation is complete. The master application can perform more or fewer operations of the method 400 without departing from the scope of this disclosure.

In some implementations, the master application can help coordinate operations for updates for more than one application or application type. For example, the master application can coordinate operations between a third application instance and a fourth application instance that includes an update of the third application instance. The third application instance and the fourth application instance can perform a different service from the first application instance and the second application instance.

The various stages of the method 400 may occur in different orders and may have multiple stages occurring concurrently, and can include more or fewer stages than those described above without departing from the scope of this disclosure.

Figure 5:
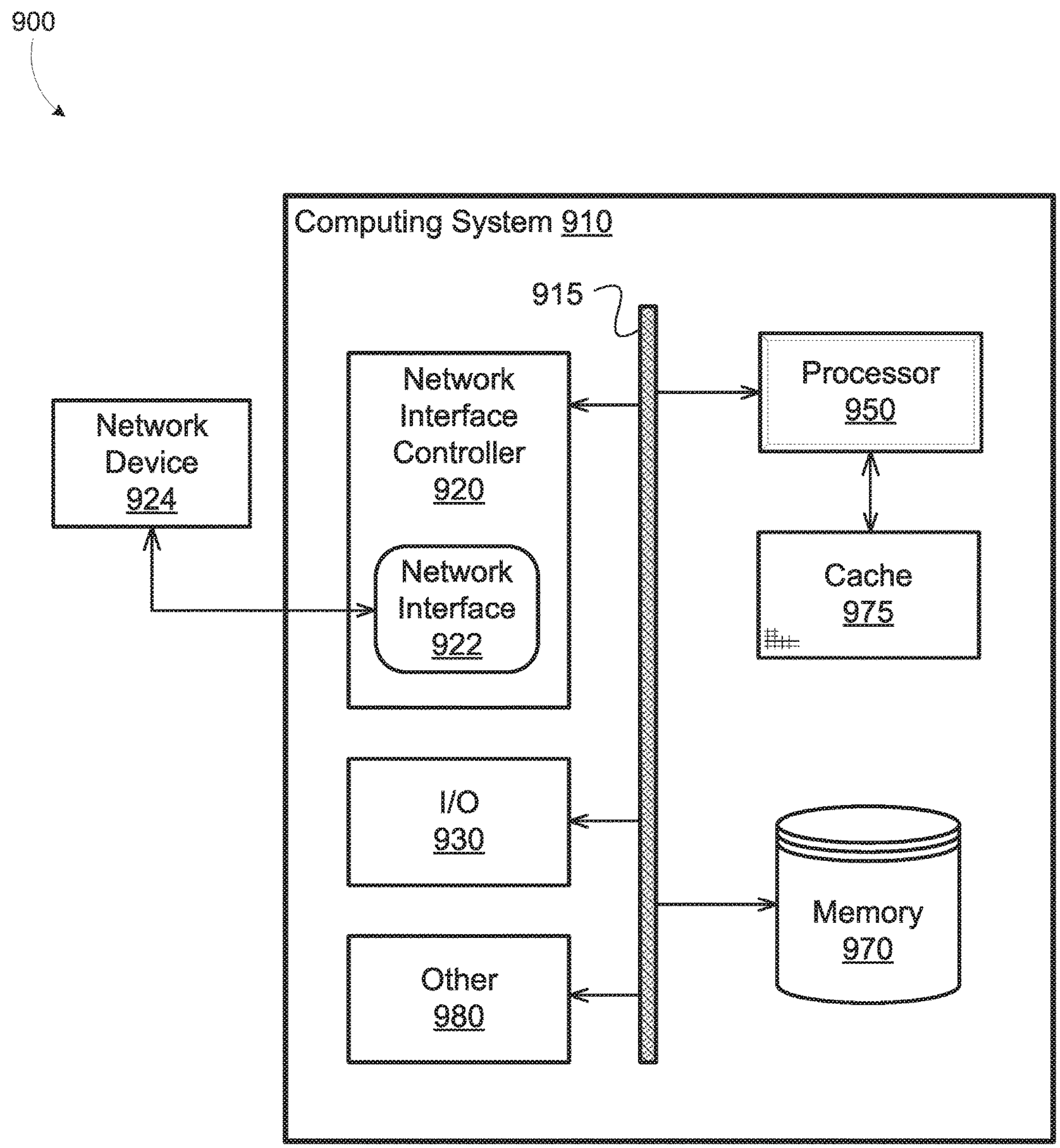
FIG. 5 is a block diagram illustrating a general architecture for a computer system that may be employed to implement elements of the systems and methods described and illustrated herein, according to an illustrative implementation.

FIG. 5 is a block diagram illustrating a general architecture for a computer system 900 that may be employed to implement elements of the systems and methods described and illustrated herein, according to an illustrative implementation. The computing system 900 may be utilized in implementing the systems and methods of updating an application without a restart shown in FIGS. 1-4.

In broad overview, the computing system 910 includes at least one processor 950 for performing actions in accordance with instructions and one or more memory devices 970 or 975 for storing instructions and data. The illustrated example computing system 910 includes one or more processors 950 in communication, via a bus 915, with at least one network interface controller 920 with one or more network interface ports 922 connecting to one or more network devices 924, memory 970, and any other devices 980, e.g., an I/O interface. Generally, a processor 950 will execute instructions received from memory. The processor 950 illustrated incorporates, or is directly connected to, cache memory 975.

In more detail, the processor 950 may be any logic circuitry that processes instructions, e.g., instructions fetched from the memory 970 or cache 975. In many embodiments, the processor 950 is a microprocessor unit or special purpose processor. The computing device 900 may be based on any processor, or set of processors, capable of operating as described herein. In some implementations, the processor 950 can be capable of executing the methods of updating an application without a restart shown in FIGS. 1-4. The processor 950 may be a single core or multi-core processor. The processor 950 may be multiple processors. In some implementations, the processor 950 can be configured to run multi-threaded operations. In some implementations, the processor 950 may host one or more virtual machines or containers, along with a hypervisor or container manager for managing the operation of the virtual machines or containers. In such implementations, the systems and methods shown in FIGS. 1-4 can be implemented within the virtualized or containerized environments provided on the processor 950.

The memory 970 may be any device suitable for storing computer readable data. The memory 970 may be a device with fixed storage or a device for reading removable storage media. Examples include all forms of non-volatile memory, media and memory devices, semiconductor memory devices (e.g., EPROM, EEPROM, SDRAM, and flash memory devices), magnetic disks, magneto optical disks, and optical discs (e.g., CD ROM, DVD-ROM, and Blu-ray® discs). A computing system 900 may have any number of memory devices 970. In some implementations, the memory 970 can include instructions corresponding to the methods of updating an application without a restart shown in FIGS. 1-4. In some implementations, the memory 970 supports virtualized or containerized memory accessible by virtual machine or container execution environments provided by the computing system 910.

The cache memory 975 is generally a form of computer memory placed in close proximity to the processor 950 for fast read times. In some implementations, the cache memory 975 is part of, or on the same chip as, the processor 950. In some implementations, there are multiple levels of cache 975, e.g., L2 and L3 cache layers.

The network interface controller 920 manages data exchanges via the network interfaces 922 (also referred to as network interface ports). The network interface controller 920 handles the physical and data link layers of the OSI model for network communication. In some implementations, some of the network interface controller's tasks are handled by the processor 950. In some implementations, the network interface controller 920 is part of the processor 950. In some implementations, a computing system 910 has multiple network interface controllers 920. The network interfaces 922 are connection points for physical network links. In some implementations, the network interface controller 920 supports wireless network connections and an interface port 922 is a wireless receiver/transmitter. Generally, a computing device 910 exchanges data with other network devices 924 via physical or wireless links to a network interfaces 922. In some implementations, the network interface controller 920 implements a network protocol such as Ethernet.

The other network devices 924 are connected to the computing device 910 via a network interface port 922. The other network devices 924 may be peer computing devices, network devices, or any other computing device with network functionality. For example, a first network device 924 may be a network device such as a hub, a bridge, a switch, or a router, connecting the computing device 910 to a data network such as the Internet.

The other devices 980 may include an I/O interface, external serial device ports, and any additional co-processors. For example, a computing system 910 may include an interface (e.g., a universal serial bus (USB) interface) for connecting input devices (e.g., a keyboard, microphone, mouse, or other pointing device), output devices (e.g., video display, speaker, or printer), or additional memory devices (e.g., portable flash drive or external media drive). In some implementations, a computing device 900 includes an additional device 980 such as a coprocessor, e.g., a math co-processor can assist the processor 950 with high precision or complex calculations.

Implementations of the subject matter and the operations described in this specification can be implemented in digital electronic circuitry, or in computer software embodied on a tangible medium, firmware, or hardware, including the structures disclosed in this specification and their structural equivalents, or in combinations of one or more of them. Implementations of the subject matter described in this specification can be implemented as one or more computer programs embodied on a tangible medium, i.e., one or more modules of computer program instructions, encoded on one or more computer storage media for execution by, or to control the operation of, a data processing apparatus. A computer storage medium can be, or be included in, a computer-readable storage device, a computer-readable storage substrate, a random or serial access memory array or device, or a combination of one or more of them. The computer storage medium can also be, or be included in, one or more separate components or media (e.g., multiple CDs, disks, or other storage devices). The computer storage medium may be tangible and non-transitory.

The operations described in this specification can be implemented as operations performed by a data processing apparatus on data stored on one or more computer-readable storage devices or received from other sources. The operations may be executed within the native environment of the data processing apparatus or within one or more virtual machines or containers hosted by the data processing apparatus.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers or one or more virtual machines or containers that are located at one site or distributed across multiple sites and interconnected by a communication network. Examples of communication networks include a local area network ("LAN") and a wide area network ("WAN"), an inter-network (e.g., the Internet), and peer-to-peer networks (e.g., ad hoc peer-to-peer networks).

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application specific integrated circuit).

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

References to "or" may be construed as inclusive so that any terms described using "or" may indicate any of a single, more than one, and all of the described terms. The labels "first," "second," "third," and so forth are not necessarily meant to indicate an ordering and are generally used merely to distinguish between like or similar items or elements.

Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

What is claimed is:

1. A system for updating an application without a restart comprising:
- a processor; and
- a memory having stored thereon instructions for causing the processor to:
- execute a first application instance;
- start a second application instance while the first application instance is still executing, the second application instance including an updated version of the first application instance;
- transfer a first set of state information from the first application instance to the second application instance;
- declare, by the second application instance in response to completion of the transfer of the first set of state information, readiness for activation;
- in response to the declaration by the second application instance of its readiness for activation, deactivate the first application instance, wherein deactivation includes:
  - transferring a second set of state information from the first application instance to the second application instance, wherein the second set of state information includes a different type of information than the first set of state information, and
  - releasing, by the first application instance, single-access resources;
- activate the second application instance, wherein activation includes:
  - receiving the second set of state information, and
  - accessing the single-access resources;
- declare, by the second application instance in response to completion of the activation of the second application instance, that activation is complete; and
- terminate the first application instance.

2. The system of claim 1, wherein the instructions cause the processor to execute a master application to coordinate operations between the first application instance and the second application instance.

3. The system of claim 2, wherein the master application:
- initiates the start of the second application instance;
- receives the declaration of readiness for activation from the second application instance;
- in response to receiving the declaration of readiness, instructs the first application instance to deactivate;
- receives a notification from the first application instance that deactivation is complete;
- in response to receiving the notification, instructs the second application instance to activate; and
- terminates the first application instance.

4. The system of claim 2, wherein the master application coordinates operations between a third application instance and a fourth application instance including an update of the third application instance, wherein the third application instance and the fourth application instance perform a different service from the first application instance and the second application instance.

5. The system of claim 1, wherein the first application instance periodically checks a pre-determined address or socket for the presence of the second application instance.

6. The system of claim 1, wherein the first set of state information comprises at least one of:
- a list of connected clients,
- locations of shared memory spaces,
- file descriptors, and
- access to kernel resources.

7. The system of claim 6, wherein the second set of state information comprises at least one of:
- TCP congestion window size,
- sequence identifiers of any packets in transit, and
- sequence identifiers of any packets received but not yet acknowledged.

8. The system of claim 1, wherein the first set of state information is written into an intermediate format that can be interpreted by both the first application instance and the second application instance.

9. The system of claim 1, wherein:
- at least a subset of the first set of state information is associated with specific clients, and
- the subset is transferred via serialization into an intermediate format that differs from a form used to serve the specific clients.

10. The system of claim 1, wherein the instructions cause the processor to:
- maintain substantially full functionality of the first application during the transfer of the first set of state information from the first application instance to the second application instance;

maintain a blackout period between commencing deactivation of the first application instance and completing activation of the second application instance, during which neither the first application instance nor the second application instance will respond to any user input.

11. The system of claim 10, wherein the blackout period is maintained for less than 100 ms.

12. The system of claim 1, wherein the first set of state information comprises background state information and the second set of state information comprises current client service data.

13. The system of claim 1, wherein the information in the first set of state information is of a type that changes with substantially lower frequency than the type of information in second set of state information.

14. A method of updating an application without a restart comprising:

executing, by a processor, a first application instance;

starting, by the processor, a second application instance while the first application instance is still executing, the second application instance including an updated version of the first application instance;

transferring, by the processor, a first set of state information from the first application instance to the second application instance;

declaring, by the second application instance in response to completion of the transfer of the first set of state information, readiness for activation;

in response to the declaration by the second application instance of its readiness for activation, deactivating, by the processor, the first application instance, wherein deactivation includes:

transferring a second set of state information from the first application instance to the second application instance, wherein the second set of state information includes a different type of information than the first set of state information, and releasing, by the first application instance, single-access resources;

activating, by the processor, the second application instance, wherein activation includes:

receiving the second set of state information, and accessing the single-access resources;

declaring, by the second application instance in response to completion of the activation of the second application instance, that activation is complete; and terminating, by the processor, the first application instance.

15. The method of claim 14, comprising:

executing, by the processor, a master application to coordinate operations between the first application instance and the second application instance.

16. The method of claim 15, wherein the master application:

initiates the start of the second application instance;

receives the declaration of readiness for activation from the second application instance;

in response to receiving the declaration of readiness, instructs the first application instance to deactivate;

receives a notification from the first application instance that deactivation is complete;

in response to receiving the notification, instructs the second application instance to activate; and terminates the first application instance.

17. The method of claim 15, wherein the master application coordinates operations between a third application instance and a fourth application instance including an update of the third application instance, wherein the third application instance and the fourth application instance perform a different service from the first application instance and the second application instance.

18. The method of claim 14, comprising:

periodically checking, by the first application instance, a pre-determined address or socket for the presence of the second application instance.

19. The method of claim 14, wherein the first set of state information comprises at least one of:

a list of connected clients, locations of shared memory spaces, file descriptors, and access to kernel resources.

20. The method of claim 19, wherein the second set of state information comprises at least one of:

TCP congestion window size, sequence identifiers of any packets in transit, and sequence identifiers of any packets received but not yet acknowledged.

21. The method of claim 14, wherein the first set of state information is written into an intermediate format that can be interpreted by both the first application instance and the second application instance.

22. The method of claim 14, wherein:

at least a subset of the first set of state information is associated with specific clients, and the subset is transferred via serialization into an intermediate format that differs from a form used to serve the specific clients.

23. The method of claim 14, comprising:

maintaining substantially full functionality of the first application during the transfer of the first set of state information from the first application instance to the second application instance;

maintaining, by the processor, a blackout period between commencing deactivation of the first application instance and completing activation of the second application instance, during which neither the first application instance nor the second application instance will respond to any user input.

24. The method of claim 23, wherein the blackout period is maintained for less than 100 ms.

25. The method of claim 14, wherein the first set of state information comprises background state information and the second set of state information comprises current client service data.

26. The method of claim 14, wherein the information in the first set of state information is of a type that changes with substantially lower frequency than the type of information in second set of state information.

* * * * *